United States Patent
Bogdahn et al.

[19]

[11] Patent Number: 6,098,428
[45] Date of Patent: Aug. 8, 2000

[54] PROCESS FOR DRAWING GLASS FIBER USING PREDICTION OF FUTURE GEOMETRIC PARAMETER OF THE FIBER

[75] Inventors: Thomas Bogdahn, Karlstein; Harald Hain, Kahl; Markoto Sajidman, Karlsruhe, all of Germany

[73] Assignee: Heraeus Quarzglas GmbH, Germany

[21] Appl. No.: 08/723,770

[22] Filed: Sep. 30, 1996

[30] Foreign Application Priority Data

Oct. 4, 1995 [DE] Germany .............. 195 36 960

[51] Int. Cl.[7] ............................ C03B 37/027; C03B 37/07
[52] U.S. Cl. .......................... 65/381; 65/382; 65/393; 65/486; 65/491
[58] Field of Search .................. 65/382, 486, 491, 65/381, 393

[56] References Cited

U.S. PATENT DOCUMENTS

| | | | |
|---|---|---|---|
| 4,102,661 | 7/1978 | Dudderar | 65/2 |
| 4,123,242 | 10/1978 | Imoto | 65/382 |
| 4,793,890 | 12/1988 | Harding | 65/382 |
| 5,013,130 | 5/1991 | Atkins | 65/382 |
| 5,073,179 | 12/1991 | Yoshimura | 65/382 |
| 5,079,433 | 1/1992 | Smith | 65/382 |
| 5,167,684 | 12/1992 | Turpin | 65/110 |
| 5,314,517 | 5/1994 | Koening et al. | 65/2 |
| 5,372,622 | 12/1994 | Atkins | 65/382 |
| 5,443,610 | 8/1995 | Urruti | 65/486 |
| 5,449,393 | 9/1995 | Tsuneishi | 65/382 |

*Primary Examiner*—John Hoffmann
*Attorney, Agent, or Firm*—Whitman Breed Abbott & Morgan LLP

[57] ABSTRACT

A glass blank is sent to a heating zone where it is softened region by region and drawn continuously in a controlled manner as a drawing bulb is formed. Estimates of at least one controlled variable are predicted free of dead time; in addition, at least one geometric variable of the component which can be correlated with the controlled variable is measured continuously, and the measurement values thus obtained are used to adjust the predicted estimates. On the basis of the predicted estimates thus adjusted, the nominal-actual deviation of the controlled variable is determined and converted to a change in a controlling variable. To ensure the production of a component with especially high dimensional accuracy, a geometric variable is measured at a first measurement site in the area of the drawing bulb for the prediction of the estimate, and the temperature of the drawing bulb be measured and used as a controlled variable. A measuring device to which a measurement site in the softened area of the blank is assigned is preferably provided to detect the geometric variable of the component.

16 Claims, 4 Drawing Sheets

PROCESS FOR DRAWING GLASS FIBER USING PREDICTION OF FUTURE GEOMETRIC PARAMETER OF THE FIBER

BACKGROUND OF THE INVENTION

The invention pertains to a process for producing an elongated component of glass by drawing from a blank, in which the blank is sent to a heating zone, where it is softened region by region; where the component is drawn off continuously in a controlled manner from the softened region, which forms a "drawing bulb"; where estimates of at least one controlled variable are predicted without any dead time; and where, furthermore, at least one geometric variable of the component which can be correlated with the controlled variable is measured continuously, the measurement values thus obtained being used to adjust the predicted estimates; and where the deviation between the nominal value and the actual value of the controlled variable is determined on the basis of the predicted estimates which have been adjusted in this way, the deviation then being converted to a change in a controlling variable.

Methods such as this are suitable for the production of, for example, tubes, rods, hollow fibers, and solid fibers.

The geometry of the component plays a decisive role in many applications where these components are used. Hollow fibers, for example, are used in chromatography, and tubes serve as semi-finished material for the production of preforms for optical waveguides or even for the waveguides themselves. Very high requirements are therefore imposed on their dimensional accuracy, which means that the corresponding production method requires complicated control processes and control units.

In the simplest case, the outside diameter of the component drawn from the blank is measured continuously by a diameter measuring device. The measurement values thus obtained are used to monitor the dimensional accuracy of the outside diameter and are simultaneously sent to a control unit, which determines deviation between the actual outside diameter and the nominal value and converts the deviations into changes in the drawing rate. In this case, the so-called "controlled variable" is the outside diameter, and the so-called "controlling variable" is the drawing rate. By means of a simple control system such as this, however, it is impossible to satisfy the high requirements imposed on the dimensional accuracy of the components. One of the main reasons for this is to be found in the "dead time" inherent in the measuring process. This is based on the fact that the outside diameter can be measured only after a certain period of time has passed after its actual formation. The effects of changes in the drawing parameters on the outside diameter are therefore evident only after a certain delay, namely, after the delay resulting from the measurement by the diameter measuring device.

To compensate for this measurement dead time of the process control system, a control concept known as the "Smith predictor" is proposed for a method of the general type in question in U.S. Pat. No. 5,314,517. According to this method, the outside diameter of an optical fiber is measured continuously in a contactless manner, and an imaginary outside diameter is predicted on the basis of the actual measurement values and the drawing rate by means of a predefined model of the process. The predicted outside diameter is then used as the controlled variable instead of the actually measured outside diameter.

To control a process by means of the Smith predictor, it is necessary to have a very accurate model of the process and to have exact knowledge of all the relevant process parameters as well as the dead measurement time. The time-variant, nonlinear, dynamic deformation behavior of the drawing process, however, cannot be easily predicted and therefore cannot be described accurately enough by means of a process model. In addition, the product parameters and dead times change unpredictably during the course of the process, which means that, in the known production method, fluctuations in the outside diameter of the fiber are unavoidable.

The invention pertains to a method for producing an elongated component of glass by drawing from a blank, in which the blank is sent to a heating zone, where it is softened region by region; where the component is drawn off continuously in a controlled manner from the softened region, which forms a drawing bulb; where at least one controlled variable of the process control system is measured continuously; and where the deviation between nominal and actual values of the controlled variable are determined from the measurement values thus obtained and converted to a change in a controlling variable. A process of the type described above is also known from U.S. Pat. No. 5,314,517. It has been found that the known control method is inadequate, especially in cases where sudden disturbances occur in the course of the process or in cases where changes occur in the process parameters during the course of the drawing process.

The invention is therefore to this extent based on the task of producing a component with high dimensional accuracy.

The invention also pertains to an apparatus for the production of an elongated component of glass by drawing from a blank, with a feed device for supplying the blank to a heating device; with a take-off device for drawing the component from a region of the blank which has been softened in the heating device; and with a measuring device for detecting a geometric variable of the component drawn from the blank, this measuring device being connected to a control unit, which determines the nominal/actual deviation of a controlled variable and sets a controlling variable as a function of the deviation.

An apparatus of the general type in question is also known from U.S. Pat. No. 5,314,517. In the known apparatus, a drawing tower for drawing an optical fiber from a preform is provided, which has a feed device for holding and feeding the preform continuously into a furnace in the vertical direction. The end of the preform projecting into the furnace is softened region by region, and a fiber is drawn from the softened region at a controllable drawing rate by a drawing device, the heating and drawing resulting in the formation of a drawing bulb. A device for measuring the outside diameter of the fiber by contactless optical means is installed between the furnace the drawing device. Both the diameter measuring device and the drawing device are connected to a control unit, which determines the deviation between the actual outside diameter of the fiber and the nominal value and converts this deviation into a change in the drawing rate. To compensate for the inherent dead time of the measurement, the control unit is provided with a Smith predictor.

The control concept of the known apparatus, which is based on a model of the process, is incapable of completely excluding fluctuations in the diameter of the optical waveguide.

The invention is therefore also based on the task of providing an apparatus by means of which elongated components of glass can be drawn with very high dimensional accuracy from a blank.

SUMMARY OF THE INVENTION

With respect to the process, the task is accomplished according to the invention on the basis of the method described above in that a measurement of a geometric variable at a first measurement site near the drawing bulb is used to predict the estimate.

The term "drawing bulb" refers to the softened region in which the blank undergoes plastic deformation.

The "geometric variable" which is measured can be any dimension of the component which can be correlated with the "controlled variable" of the process control system. In the normal case, this will be the "controlled variable" itself. For the sake of simplicity, this is assumed in the following. Because of the persistence of the process of deformation in the area of the drawing bulb, the measurement value obtained there, however, does not correspond to the final value of the component.

Because the geometric variable is measured in the area of the drawing bulb, it is possible for the process to be controlled without any dead time, because changes in the process parameters - especially changes in the controlling variable—result immediately in changes in the geometric variable at the first measurement site in the area of the drawing bulb and are detected there without any dead time.

The inventors made the surprising discovery that the actual value of the geometric dimension of the component ultimately reached outside this region can be predicted very accurately on the basis of the value for this geometric variable found in this region.

The predicted estimate is subjected to an adjustment. The concrete way in which this adjustment is made is left to the discretion of the expert. For example, for the purpose of adjustment, the actual value of the geometric variable in question can first be measured at a second measurement site and compared with the predicted estimate. In this case, the deviation between the two values can then be taken into account in the determination of the actual value of the controlled variable by means of the following equation:

$$y_{control}(t) = y_{predicted}(t) + (y_{measured}(t) - y_{predicted}(t - T_{dead})) \quad (1)$$

where $y_{control}$ is the actual value of the controlled variable; $y_{predicted}$ is the predicted estimate; $y_{measured}$ is the measured value of the geometric variable; t is the time; and $T_{dead}$ is the dead measurement time.

The predictions thus obtained concerning the actual value of the geometric variable or the actual values of the geometric variables of the component are extremely accurate and almost completely independent of fluctuations in the process parameters, because they are not, as in the process according to the state of the art, based upon a measurement value suffering from measurement dead time and a linear model but rather upon a real, dead time-free measurement value.

The "elongated" components produced according to the invention can have any of the geometries explained above.

The blank can be introduced into the heating zone vertically, horizontally, or at an angle; when either of the latter two variants is used, the blank must be rotated around its longitudinal axis. It is obvious that, in a kinematic inversion of the method, the heating zone can also be moved over the blank. Normally, the rate at which the blank is fed to the heating zone is constant; but it can also be varied.

The "continual measurement" of the geometric variable of the component in the area of the drawing bulb can be either continuous or discontinuous; in a discontinuous measurement, the accuracy of the process control increases with decreasing time intervals between successive measurements.

For the determination of the predicted estimate, a method is preferred which comprises the following steps:

(a) a first measurement of the geometric variable is made at the first measurement site;

(b) a second measurement of the geometric variable is made at a second measurement site, which follows the first measurement site in the drawing direction by a fixed inter-site distance, the measurement being made after a period of time resulting from the relationship between the inter-site distance and the drawing rate;

(c) a correlation value is determined from the first and second measurements;

(d) the geometric variable is measured again at the first measurement site; and (e) the estimate is predicted on the basis of measurement value obtained according to (d) and the correlation value.

It is favorable for the second measurement site to be located in a region where the component is no longer undergoing deformation and thus in a region where the geometric variable to be measured has reached its final value.

It is not necessary for the geometric variable measured at the first measurement site to involve the same dimension of the component as the geometric variable measured at the second measurement site. The only essential point is that there be a fixed mathematical relationship between the respective "geometric variables". Thus, for example, in the case of a hollow, cylindrical component with a known wall thickness, the inside diameter can be measured at the first measurement site and the outside diameter can be measured at the second measurement site. A method is preferred, however, in which the same dimension is measured as the geometric variable at both measurement sites, and in which, as already discussed above, the measured geometric variable or the estimate predicted for it is simultaneously the controlled variable of the process control system.

The period of time explained in step (b) would correspond to the measurement dead time of the control system if the actual value of the controlled variable were to be determined on the basis of the second measurement site. In this step of the method, the geometric variable measured at the first measurement site is measured again at the second measurement site after a delay in a shift register by a period of time equal to the measurement dead time. The values measured at the first and second measurement sites show the following, experimentally determined, mathematical relationship:

$$y_2(t) = a_0(t) + a_1 \cdot y_1(t - T_{dead}) \quad (2)$$

where $y_1$ is the measurement value at the first measurement site; $y_2$ is the measurement value at the second measurement site; $a_0$ is a time-variant parameter; $a_1$ is a time-invariant parameter; t is the time; and $T_{dead}$ is the measurement dead time. It was found that parameter $a_1$ is a constant specific to the process, whereas parameter $a_0$, which in this case is simultaneously the correlation value to be determined, can change slowly over the course of the production process.

Thus, according to step (c), it is possible to determine from the values measured in this way a correlation value which remains more-or-less constant over the duration of the process. This correlation value can then be used as the basis for predicting the estimate at the second measurement site for every other (dead time-free) measurement of the geometric variable at the first measurement site.

The actual value of the controlled variable is thus calculated by means of the following equation (corresponding to Equation (1)):

$$y_{control}(t)=a_0(t)+(y_2(t)-a_1 \cdot y_1(t-T_{dead})) \quad (3)$$

An especially accurate prediction of the estimate can be obtained by a method in which the correlation value is determined not only according to step (c) but also on the basis of measurements or settings of the controlling variable.

A method which has been found to be especially advantageous is that in which the correlation value is updated at regular time intervals, preferably at intervals in the range of 0.5–5 seconds. These values apply to the drawing of the component at intermediate rates of 0.2–4 m/min. The choice of a suitable sampling frequency, however, depends very strongly on the rate at which the component is drawn. At very high drawing rates in the range of several meters per second, it is reasonable to use much higher sampling rates in the range below 0.1 Hz.

The preferred controlled variable is the outside diameter of the component, and/or, in the case of a tubular component, the inside diameter and/or the wall thickness.

The method described below is preferred for the production of tubular components. In it, at least one additional, i.e., a second, controlled variable is provided, and the estimate of the second controlled variable is predicted on the basis of measurements or settings of at least one controlling variable of the control system by the use of a linear model of the Smith predictor type. The method comprises the following steps:

(a) a first measurement of the geometric variable is made to determine a first value of the second controlled variable;

(b) the nominal/actual deviation of the controlled variable found according to step (a) is determined;

(c) the deviation is converted to an imaginary change in the controlling value of the controlling variable;

(d) a realistic model of the dynamic systems behavior existing between the controlling variable and the second controlled variable is prepared; and (e) the estimate is predicted on the basis of the imaginary change in the controlling value and the model according to step (d) by the use of the measurement value of the first measurement of the geometric variable at the first measurement site.

The prediction is made with the use of a model of the dynamic systems behavior present between the controlling variable and the controlled variable. A 1st-order model can be described by the following general equation:

$$y(t)+T \cdot dy(t)/dt=k \cdot u(t),$$

where y is the controlled variable; u is the controlling variable; T is a time constant which describes the dynamic relationship between a change in the controlling variable and the controlled variable; dy(t)/dt is the derivation of the controlled variable with respect to time; and k is a constant proportional control factor between the change in the controlling variable and the change in the controlled variable. T is usually determined empirically: k can be easily derived analytically for the particular control circuit in question.

In the following, models for the control of the diameter (D) of the component, its cross-sectional area (A) or, in the case of a tubular component, the wall thickness (W) and the wall thickness-diameter ratio (Q), analytically derived on the basis of the above-cited general equation, are described.

MODELS OF THE DIAMETER AND WALL THICKNESS $$D(t) = D_O + D_v(t) + D_p(t)$$

| | |
|---|---|
| $D_v(t) + T_v \cdot dD_v(t)/dt =$ $k_{D,v} \cdot (v(t) - v_0)$ | $D_p(t) + 2 \cdot T_p \cdot dD_p(t)/dt +$ $T_p^2 \cdot d^2D_p(t)/dt^2 =$ $k_{D,p} \cdot (p(t) - p_0)$ |
| $K_{D,v} = -D_0/2 \cdot v_0$ | $k_{D,p} = (D_0/2p_0) \cdot ((D_0 - 2W_D)/(D_0 - W_0)) \cdot \log(1/Q_0)$ |

$$W(t) = W_O + W_v(t) + W_p(t)$$

| | |
|---|---|
| $W_v(t) + T_v \cdot dW_v(t)/dt =$ $k_{W,v} \cdot (v(t) - v_0)$ | $W_p(t) + 2 \cdot T_p \cdot dW_p(t)/dt +$ $T_p^2 \cdot d^2W_p(t)/dt^2 =$ $k_{W,p} \cdot (p(t) - p_0)$ |
| $K_{W,v} = -W_0/2 \cdot v_0$ | $k_{W,p} = -W_0/2 \cdot p_0 \cdot D_0/(D_0 - W_0) \cdot \log(1/Q_0)$ |

LINEAR MODEL OF THE CROSS-SECTIONAL AREA $$A(t)=A_0+A_v(t)$$

$$A_v(t)+T_v \cdot dA_v(t)/dt=k_{A,v} \cdot (v(t)-V_0)$$

$$k_{A,v}=-A_0/v_0$$

MODEL OF THE RATIO OF WALL THICKNESS TO DIAMETER $$Q(t)=Q_0+Q_p(t), \text{ where } Q=W/D$$

$$Q_p(t)+2 \cdot T_p \cdot dQ_p(t)/dt+T_p^2 \cdot d^2Q_p(t)/dt^2=k_{Q,p} \cdot (p(t)-p_0)$$

$$k_{Q,p}=-Q_0/p_0 \cdot \log(1/Q_N), \text{ where } Q_N=(W_0/D_0)/(W_{Roh}/D_{Roh})$$

where:

t=time or duration of the process v=take-off rate $v_0$=working point of the take-off rate p=blowing pressure $p_0$=working point of the blowing pressure D=diameter $D_0$=nominal value of the diameter $D_{Roh}$=diameter of the blank $D_v$=take-off rate component of the diameter $D_p$=blowing pressure component of the diameter W=wall thickness $W_0$=nominal value of the wall thickness $W_{Roh}$=wall thickness of the blank $W_v$=take-off rate component of the wall thickness $W_p$=blowing pressure component of the wall thickness A=cross-sectional area $A_0$=nominal value of the cross-sectional area $A_v$=take-off rate of the cross-sectional area Q=ratio of wall thickness to diameter (=drawing ratio)

$Q_0$=nominal value of the drawing ratio $Q_p$=blowing pressure component of the drawing ratio $Q_N$=normalized nominal value of the drawing ratio $k_{D,v}$=proportional control factor between drawing rate and diameter $k_{D,p}$=proportional control factor between blowing pressure and diameter $k_{W,v}$=proportional control factor between take-off rate and wall thickness $k_{W,p}$=proportional control factor between blowing pressure and wall thickness $K_{A,v}$=proportional control factor between take-off rate and wall thickness $K_{Q,p}$=proportional control factor between blowing pressure and nominal value of the drawing ratio $T_v$=time constant of the take-off rate dynamic $T_p$=time constant of the blowing pressure dynamic A method in which the cross-sectional area of the component is used as the controlled variable and the drawing rate is used as the controlling variable is especially advantageous in the case of tubular components. The expression "cross-sectional area of the component" is understood to mean the area of a cross section through the walls of the component perpendicular to the drawing direction. The drawing rate influences the cross-sectional area of the component, but the blowing pressure applied to the interior of the tubular component does not. Conversely, therefore, in another preferred method, the wall thickness/outside diameter ratio or the wall thickness/inside diameter ratio is used as the controlled variable, and a controllable blowing pressure applied to the interior of the tubular component is used as the controlling variable.

The cross-sectional area and the wall thickness/diameter ratio serve here as "equivalent variables" for the control of the wall thickness according to a model-based method. It is not absolutely necessary in this case to make a prediction based on a measurement of the geometric variable at the first measurement site near the drawing bulb. Nevertheless, it is possible to achieve a further increase in dimensional accuracy by combining the two prediction methods, namely, the method of predicting the controlled variable on the basis of a measurement of the geometric variable at a first measurement site and the method of predicting the controlled variable on the basis of a linear model under consideration of the settings of the process parameters, both in the case of the cross-sectional area and also in the case of the wall thickness/diameter ratio.

Such combination methods have proven useful in the production of tubes of hollow fibers, for which it is necessary to control at least two different controlled variables to ensure the dimensional accuracy. Preferred in this case are the combination of outside diameter plus cross-sectional area and the combination of outside diameter plus wall thickness/outside diameter ratio. Other combinations, however, can also be conceived and are not excluded by the invention.

It has been found especially useful in the production of tubular component to use the outside diameter as the first controlled variable and the blowing pressure maintained inside the tubular component as the controlling variable for it; and to use the cross-sectional area of the walls of the component as the second controlled variable and the drawing rate as the controlling variable for it.

In an alternative preferred method for the production of a tubular component, the outside diameter is used as the first controlled variable and the drawing rate as the controlling variable for it; and the ratio of wall thickness to outside diameter of the component is used as the second controlled variable and the blowing pressure maintained inside the tubular component as the controlling variable for it.

Because the two automatic control circuits usually interact with each other, it is advantageous to provide for the static or dynamic decoupling of the two control circuits. In contrast to static decoupling, dynamic decoupling takes into account the fact that the controlling variables in question act in different ways with respect to time on the controlled variables.

A method in which fuzzy logic controllers are used in the control system has been found especially suitable for the production of dimensionally accurate components. In this way, heuristic control strategies can be incorporated in the control system.

The task described above with respect to the process, furthermore, can also be accomplished on the basis of the method described above by measuring the temperature of the drawing bulb and using that as a controlled variable.

Changes in the drawing bulb temperature, such as those which occur during the startup phase, for example, or during the final phase of the drawing process, are detected by the method according to the invention and can be compensated by a correction of the temperature of the heating device. It must kept in mind here that the temperature of the glass in the area of the drawing bulb, not the temperature of the heating device, is the factor which determines the deformation behavior of the glass. Increasing the uniformity of the drawing bulb temperature results in greater uniformity of the dynamic deformation behavior and thus leads to a significant improvement in the dimensional accuracy of the component. The temperature of the drawing bulb can be used as a controlled variable both alternatively to, and in conjunction with, the temperature of the heating device.

In a preferred method, the temperature of the heating device is also measured, and the temperature of the bulb is used in a cascaded control system as the main controlled variable, whereas the temperature of the heating device is used as an auxiliary controlled variable. The temperature of the heating device usually reacts quickly to changes in the associated temperature controller, whereas the temperature of the drawing bulb changes slowly as a result of the changes in the ambient temperature. The last-named variant therefore offers the advantage with respect to the control behavior that it is possible to use both a controlled system with a very short integration time for keeping the temperature of the heating device extremely uniform and a controlled system with a very long integration time for determining the viscosity in the deformation area reproducibly. It is advantageous to measure the temperature of the drawing bulb by means of a pyrometer.

With respect to the apparatus, the task described above can be accomplished in accordance with the invention on the basis of the apparatus cited above by providing a measuring device to detect the geometric variable of the component and by assigning a measurement site in the softened area of the blank to this device.

Providing the measuring device as called for by the invention makes it possible for the geometric variable of the component to be measured without any dead time. The measuring device detects the geometric variable, which can be, for example, the outside diameter or the wall thickness, of the component in the softened area. This means that the component is still undergoing deformation and that the measured value of the geometric variable does not necessarily agree with the final, actual value of the geometric variable. By means of the value of the geometric variable measured without dead time, however, it is possible, as explained above on the basis of the description of the method according to the invention, to make a prediction concerning the final value which the geometric variable of the component can be expected to have, which can then be used as an actual value for the controlled variable for the process control or from which such an actual value can be derived.

The measurement is made in a contactless manner, which means that the measurement site on the component, where the measurement value is obtained, is a certain distance away from the measuring device. The measuring device can be an optical instrument such as that normally used for measuring diameters, or it can be a video camera.

An apparatus with two measuring devices a certain distance apart, connected to the control unit, has proved especially effective. The measurement sites of the respective measuring devices remain a certain distance away from each other. The measurement site of the additional measuring device is situated in an area in which the component is no longer undergoing deformation. The value of the geometric variable measured there serves to monitor the dimensional accuracy. It is also possible, as discussed above on the basis of the description of the method, for the measurement value thus obtained to be processed in the common control unit for the sake of the process control.

It is advantageous to install one of the measuring devices near the heating element. This simplifies the adjustment of the measuring device, especially when there is the danger that the softened region of the blank, i.e., the drawing bulb, changes its position over the course of the process. This measuring device is advisably located outside the heating element, at least one opening being provided in the heating element, through which the measurement of the geometric variable can be made in a contactless manner. In this way, the measuring device can be located very near the softened area.

Devices for measuring diameters are preferred, in which case the diameter of the component serves as the geometric variable. In the case of tubular components, the inside diameter or the wall thickness is measured.

An apparatus in which a pyrometer is provided to measure the temperature of the blank in the softened region, i.e., in the area of the drawing bulb, has also proved effective; this pyrometer is connected to the control unit. It is advantageous for the temperature of the drawing bulb to be taken into account in the control of the process. As a result, the apparatus makes it possible for the process to be guided with much greater uniformity, especially under conditions of temperature fluctuations such as those which occur at the beginning and at the end of the process.

An apparatus in which the control unit is connected to the take-off and/or to the feed device and/or to the heating device and/or—in the case of hollow, cylindrical components—to a control valve for the internal pressure of the component has proved especially suitable.

An apparatus in which fuzzy logic controllers are used for the control unit has proved to be especially effective. It is advantageous in this case for all the controllers to be designed as fuzzy logic controllers.

DETAILED DESCRIPTION OF THE PREFERRED EMBODIMENTS

Figure 1:
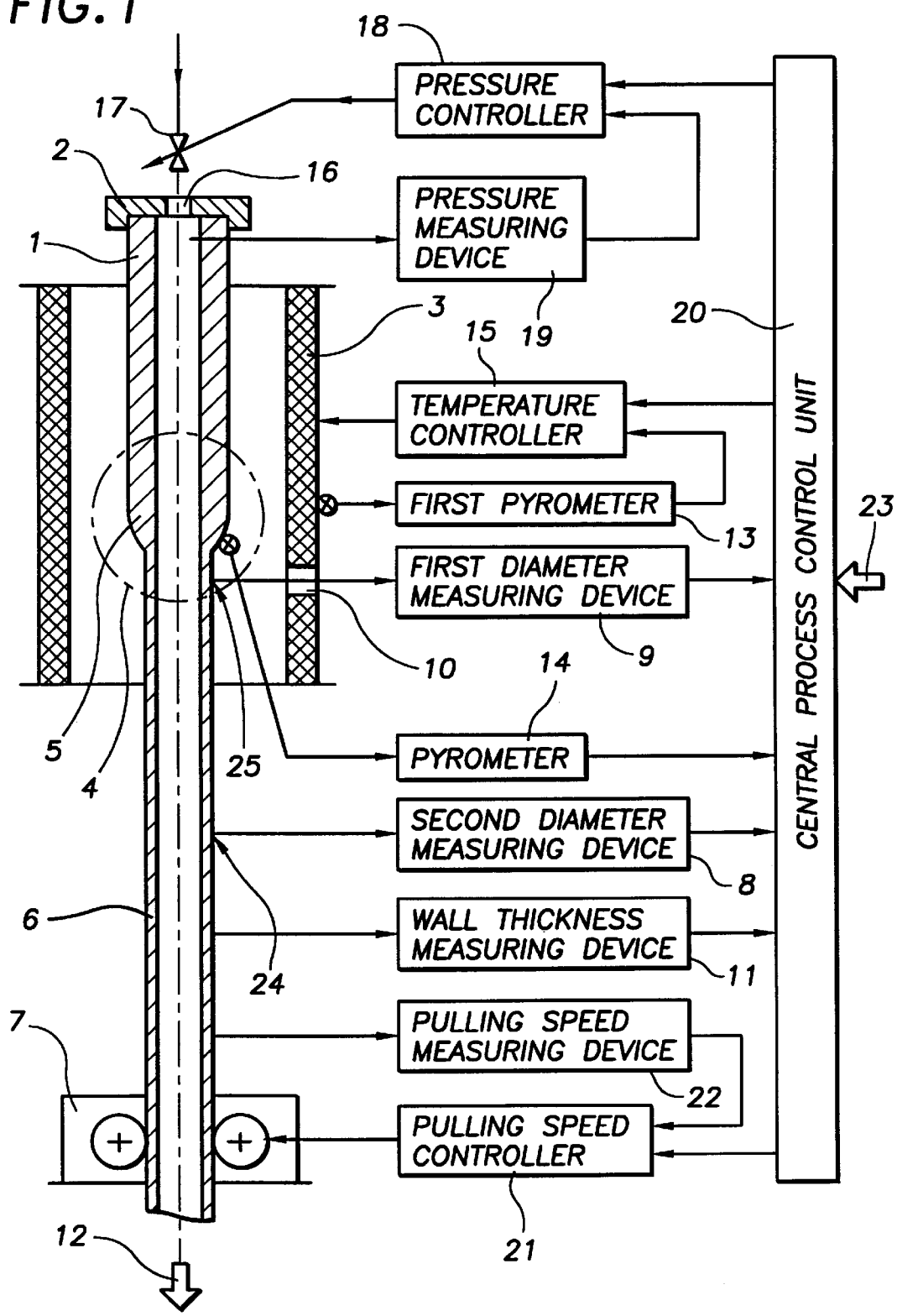
FIG. 1 shows a longitudinal cross section of an apparatus according to the invention for drawing a tube.

In FIG. 1, reference number 1 designates a hollow, cylindrical quartz glass blank, which is held by a support 2 and fed continuously by means of a feed device (not shown in FIG. 1) to a furnace 3. Inside furnace 3, blank 1 is heated region by region, beginning at one end, so that it softens in a deformation zone 4 and so that a tube 6 can be pulled off from it by means of a take-off device 7 as a drawing bulb 5 is formed.

To determine the outside diameter of tube 6, a diameter measuring device 8 is provided. Diameter measuring device 8 is located a certain distance away from deformation zone 4. The separation distance is determined by the length to which the tube is drawn before the quartz glass solidifies completely. Aside from slight changes in the diameter of tube 6 caused by complete cooling, diameter measuring device 8 measures the final outside diameter of tube 6.

To determine the diameter of the tube inside deformation zone 4, a first diameter measuring device 9 is installed in the immediate vicinity of furnace 3. First diameter measuring device 9 detects the outside diameter of the tube in the area of deformation zone 4 in a contactless manner through an opening 10 provided in furnace 3. First diameter measuring device 9 is installed in the viscous, outgoing area of deformation zone 4, i.e., in the lower area of drawing bulb 5.

Figure 3:
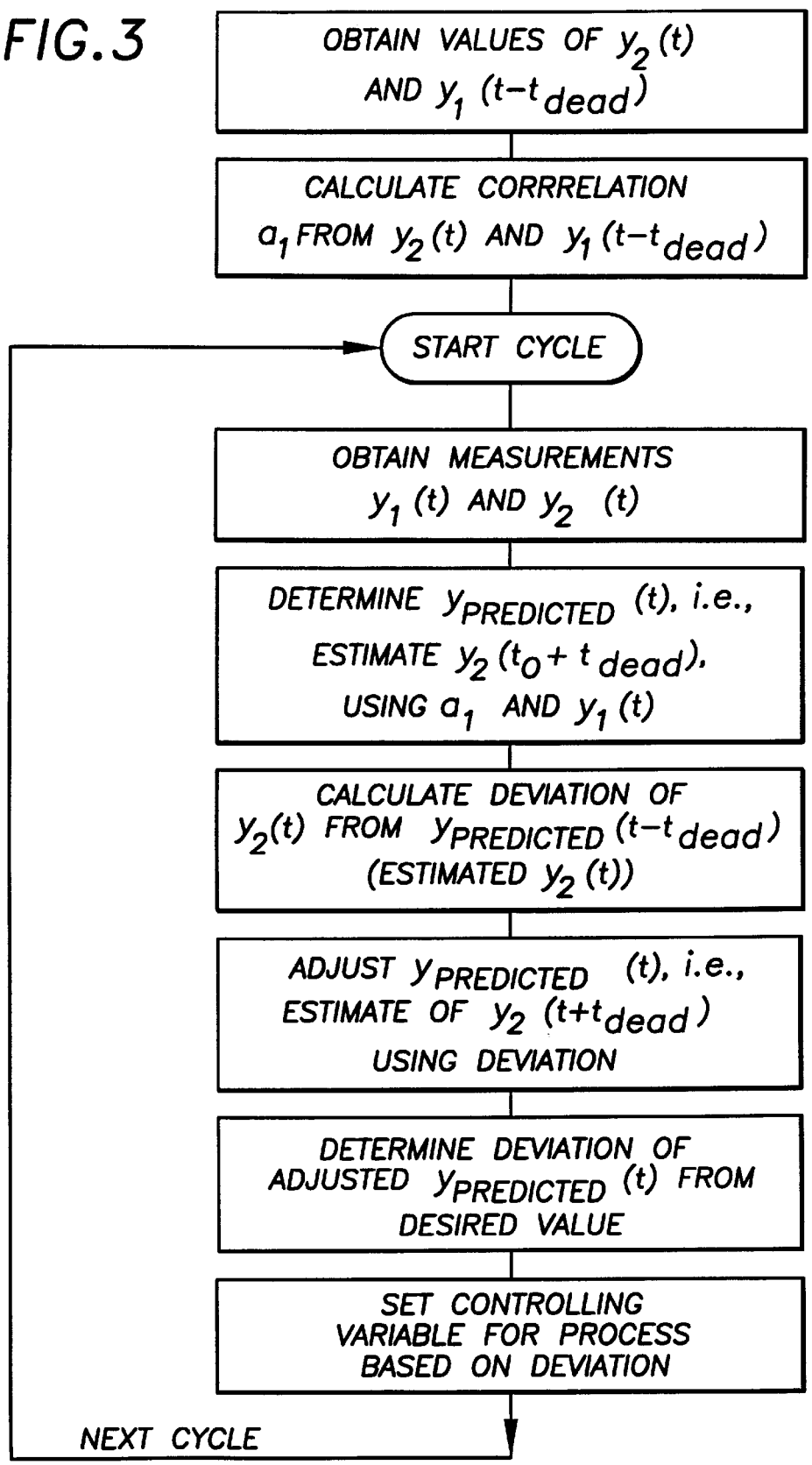
FIG. 3 shows a flowchart of an exemplary system described herein.

By means of the diameter values measured at this point, estimates of the final tube diameter can be predicted without any dead time. See FIG. 3. In contrast, the estimates predicted on the basis of the diameters measured by diameter measuring device 8 would suffer from the error associated with a measuring dead time.

To determine the wall thickness, furthermore, a wall thickness measuring device 11 is provided, which is located underneath diameter measuring device 8, as seen in the drawing direction (as indicated by directional arrow 12). Wall thickness measuring device 11 operates according to the reflection method; that is, the wall thickness is determined on the basis of the distance between the reflection peaks produced by the internal and external surfaces of tube 6.

To measure the temperature of furnace 3, a first pyrometer 13 is employed. The temperature of drawing bulb 5 is measured by means of a second pyrometer 14. The temperature of furnace 3 is controlled by means of a temperature controller 15; for this temperature control, the temperature of the drawing bulb measured by second pyrometer 14 is used as the main controlled variable, whereas the temperature measured by first pyrometer 13 is taken into account as an auxiliary controlled variable in a cascaded control system.

Support 2 has a hole 16, which opens into the interior of the tube and through which, by way of a valve 17 and a pressure controller 18. compressed air is conducted into the interior of tube 6. The internal pressure inside tube 6 is detected by means of a pressure measuring device 19.

The rate at which the tube is pulled off is detected by means of a speed measuring device 22 and adjusted by means of a speed controller 21.

The measuring sites near tube 6 and furnace 3 assigned to measuring devices 8; 9; 13; 14; 19; 22, shown schematically in the drawing, are characterized by the connecting lines proceeding from the devices.

The following parameters are supplied to a central process control unit 20: the tube take-off rate detected by the speed measuring device 22; the outside diameter of the tube measured by diameter measuring device 8; the outside diameter of the tube measured by first diameter measuring device 9; the wall thickness of the tube measured by wall thickness measuring device 11; the temperature of furnace 3 measured by first pyrometer 13; the temperature of drawing bulb 5 measured by pyrometer 14; and the internal pressure inside the tube measured by pressure measuring device 19. Process control unit 20 controls compressed gas valve 18, temperature controller 15 of furnace 3, and controller 21 of take-off unit 7.

Process control unit 20 can accept as input predetermined nominal values such as values for the internal diameter of the tube, for the outside diameter of the tube, for the wall thickness, and for the mass throughput, which is illustrated schematically by input arrow 23.

In the following, an exemplary embodiment of the method according to the invention is explained in greater detail on the basis of FIG. 1.

During the deformation of tube 6 in furnace 3, both the cross-sectional area and the wall thickness-diameter ratio are reduced. The forces of deformation acting in the axial direction result indirectly from the difference between the fixed, preset feed rate used here and the controllable tube take-off rate. The forces of deformation of tube 6 in the radial direction are the result of a defined differential pressure between the interior of the tube and the environment, which is also referred to as the blowing pressure.

In the first exemplary embodiment, the quartz glass blank is sent to furnace 3 at a constant rate; the temperature of furnace 3 is set initially at approximately 2,200° C. The temperature of drawing bulb 5, which is measured by pyrometer 14 and adjusted to a nominal value of around 1,800° C., is used as the controlled variable for the temperature control of the furnace.

The outside diameter of tube 6 and the cross-sectional area of the walls of tube 6 are used as the controlled variables for the control of the process. The blowing pressure is used as the controlling variable for the outside diameter, and the take-off rate is used as the controlling variable for the cross-sectional area.

Figure 4:
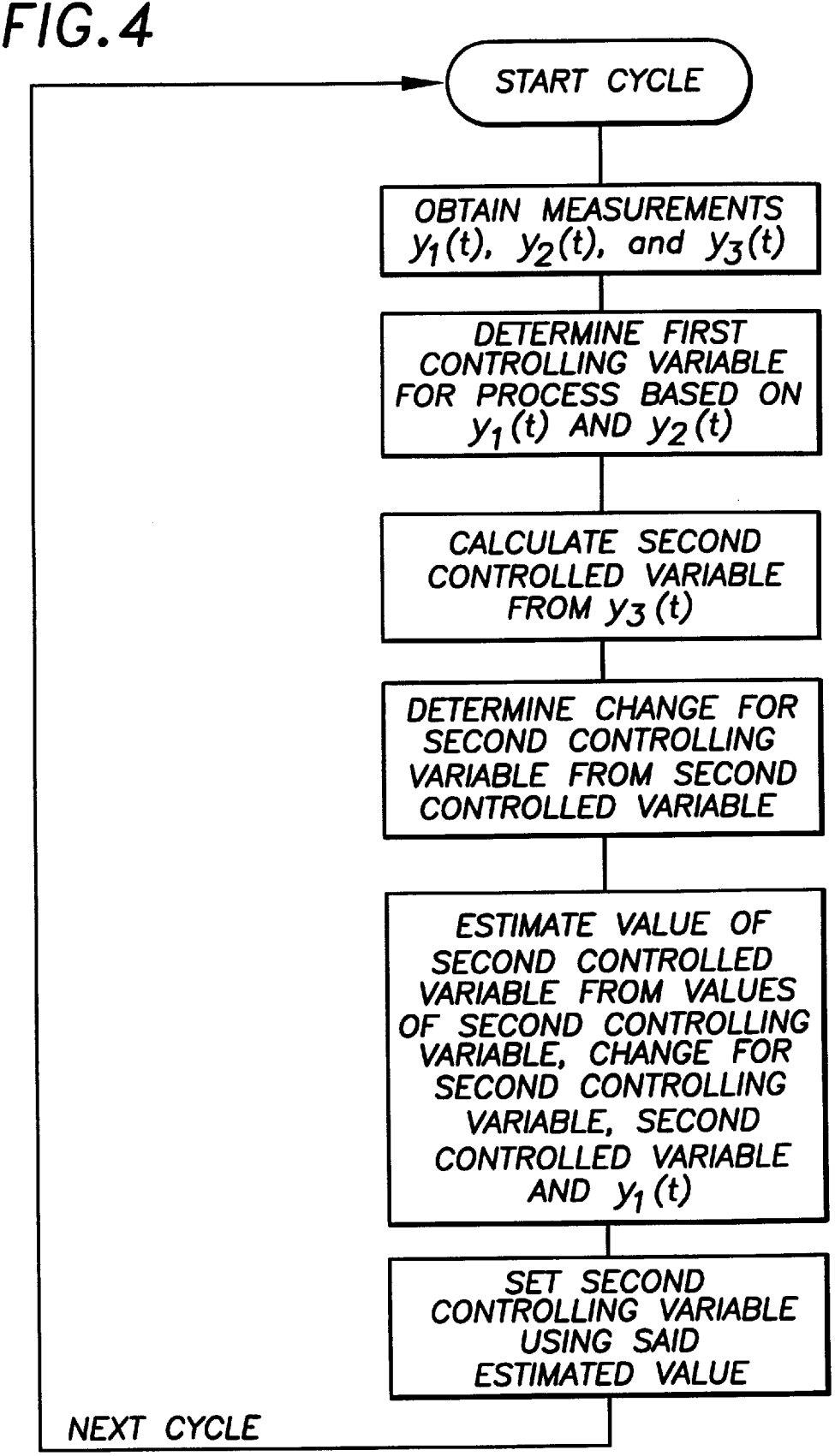
FIG. 4 shows in flowchart form a further embodiment of the invention.

How the cross-sectional area is adjusted to agree with the control input is explained below. See also FIG. 4.

At measurement site 25, first diameter measuring device 9 measures a first value for the outside diameter of the tube. The wall thickness of tube 6 is determined by means of wall thickness measuring device 22, and from that the cross-sectional area of the wall is calculated. From that calculated value, the nominal-actual deviation of the cross-sectional area of the tube wall is found and converted to a first imaginary change in the tube take-off rate. On the basis of a realistic model of the dynamic systems behavior existing between the tube take-off rate and the cross-sectional area of the tube wall and the imaginary change in the tube take-off rate and under consideration of the measurement value obtained in the first measurement of the outside diameter at first measurement site 25, an estimate is predicted for the cross-sectional area, which is then used as the actual value of the controlled variable for the further course of the process control.

The realistic model used for this purpose can be characterized by the following equation:

Model of the cross-sectional area:

$$y(t)+T \cdot dy(t)/dt = k \cdot u(t),$$

where y is the cross-sectional area, dy/dt is the change over time in the cross-sectional area; u is the take-off rate; t is the time; k is the proportional control factor; and T is the time constant.

The actual value of the controlled variable is then calculated according to the following equation:

$$y_{control}(t) = y_{predicted}(t) + (y_{measured}(t) - y_{predicted}(t - T_{dead})),$$

where $y_{control}$ is the actual value of the controlled variable; $y_{predicted}$ is the estimate of the cross-sectional area predicted by means of the linear model and the measured take-off rate; $y_{measured}$ is the value of the cross-sectional area calculated from the measured values of the outside diameter and wall thickness; t is the time; and $T_{dead}$ is the measurement dead time. How the outside diameter is adjusted to match the control input is explained below.

To eliminate the measurement dead time, the outside diameter of tube 6 is estimated. For this prediction of the outside diameter of the tube, the diameter of tube 6 is measured first at upper measurement point 25 in deformation zone 4, and then compared—after a delay in a shift register equal to the measurement dead time between upper measurement point 25 and lower measurement point 24—with the tube diameter measured by diameter measuring device 8 at lower measurement point 24.

A correlation model is then used to determine a correlation value between the outside diameter measured at upper measurement point 25 and the outside diameter value measured at lower measurement point 24. This correlation value can then be used to predict the final outside diameter of the tube for each subsequent outside diameter measured by first diameter measuring device 9.

The prediction model used here can be described by the following equation:

$$a_0(t) = y_2(t) - a_1 \cdot y_1(t - T_{dead}),$$

where $y_1$ is the measurement value of the outside diameter at the first measurement site; $y_2$ is the measurement value of the outside diameter at the second measurement site; $a_0$ is the time-variant correlation value to be determined; $a_1$ is a time-invariant parameter; t is the time; and $T_{dead}$ is the measurement dead time.

The actual value to controlled variable of the outside diameter is then calculated according to the following equation:

$$y_{control}(t) = a_1 \cdot y_1(t) + (y_2(t) - a_1 \cdot y_1(t - T_{dead})),$$

where $y_{control}$ is the actual value of the controlled variable.

The advantageous effect of the invention consists in a significant improvement in the dimensional accuracy of all the dimensions of tube 6 over the entire strand of tubing, especially including the cross-sectional area of the tube, insofar as. for control, the value of the cross-sectional area which has been estimated without any dead time is used instead of the actual wall thickness measured by wall thickness measuring device 22 and the cross-sectional area calculated from that, and insofar as the value of the outside diameter which has been estimated without any dead time is used.

The use of this combination of controlling variables and controlled variables, namely, the control of the outside diameter of the tube by way of the blowing pressure, combined with the control of the cross-sectional area by way of the take-off rate, has been found to be highly advantageous especially in cases of thin-walled tubing.

A further improvement in the dimensional accuracy of tube 6 is achieved by making use of the drawing bulb temperature supplied by pyrometer 14. The effect of this temperature measurement is that nonsteady-state changes in the deformation temperature, such as those which occur during the startup or final phase of the process, are recognized by changes in the temperature of deformation zone 4 and can be compensated by a correction of the furnace temperature. This results in greater uniformity of the deformation temperature and therefore in greater uniformity of the dynamic deformation behavior and a significant improvement in the dimensional accuracy.

In a second exemplary embodiment, the quartz glass blank is sent to furnace 3 at a constant feed rate; the temperature of furnace 3 is set initially at 2,000° C. The temperature of drawing bulb 5, which is measured by pyrometer 14 and which is maintained at a nominal value of around 1,800° C., is used as the controlled variable for the control of the temperature.

The outside diameter of tube 6 and the wall thickness-diameter ratio of tube 6 are used as the controlled variables for the control of the process. The take-off rate is used as the controlling variable for the outside diameter, and the blowing pressure is used as the controlling variable for the wall thickness-diameter ratio.

The way in which the wall thickness-diameter ratio is adjusted to match the control input is explained in greater detail below.

At measurement site 25, first diameter measuring device 9 measures a first value for the outside diameter of the tube. The drawing ratio is calculated from the measurement values determined by wall thickness measuring device 22 and diameter measuring device 8. From that value, the nominal-actual deviation of the drawing ratio is determined and converted into a first imaginary change in the blowing pressure. On the basis of a realistic model of the dynamic systems behavior existing between the drawing ratio and the blowing pressure, as well as the imaginary change in the blowing pressure, an estimate for the drawing ratio is predicted under consideration of the measurement value of the first measurement of the outside diameter at the first measurement site 25, and this predicted value is used as the actual value of the controlled variable for the ensuing process control.

The model of the wall thickness-diameter ratio is:

$$y(t)+2T \cdot dy(t)/dt+T^2 \cdot d^2y(t)/dt^2=k \cdot u(t),$$

where y is the wall thickness-diameter ratio, dy/dt is the change over time in the wall thickness-diameter ratio; $d^2y/dt^2$ is the second derivative of the wall thickness-diameter ratio with respect to time; u is the blowing pressure; t is the time; k is the proportional control factor; and T is the time constant.

The way in which the outside diameter is adjusted to match the control input is analogous to the method already explained on the basis of the first exemplary embodiment, except that. in place of the blowing pressure, the take-off rate is used as the controlling variable.

The use of this combination of controlling variables and controlled variables, namely, the control of the outside diameter by means of the take-off rate and the control of the wall thickness-outside diameter ratio by means of the blowing pressure, has been found highly advantageous especially in cases of thick-walled tubing.

In a third exemplary embodiment of the method according to the invention, both the cross-sectional area of tube 6 and the wall thickness-outside diameter ratio are used as controlled variables, and both the drawing rate and the blowing pressure are used as controlled variables. Here the drawing rate influences primarily the cross-sectional area of the tube wall, not the drawing ratio, whereas, conversely, the blowing pressure influences the drawing ratio, but not the cross-sectional area of the tube wall. Through the combination of the two above-mentioned control mechanisms in an overall control system, it is therefore possible to control both the cross-sectional area of the tube wall and also the drawing ratio almost independently of each other. It is provided that the two control circuits are dynamically decoupled.

Figure 2:
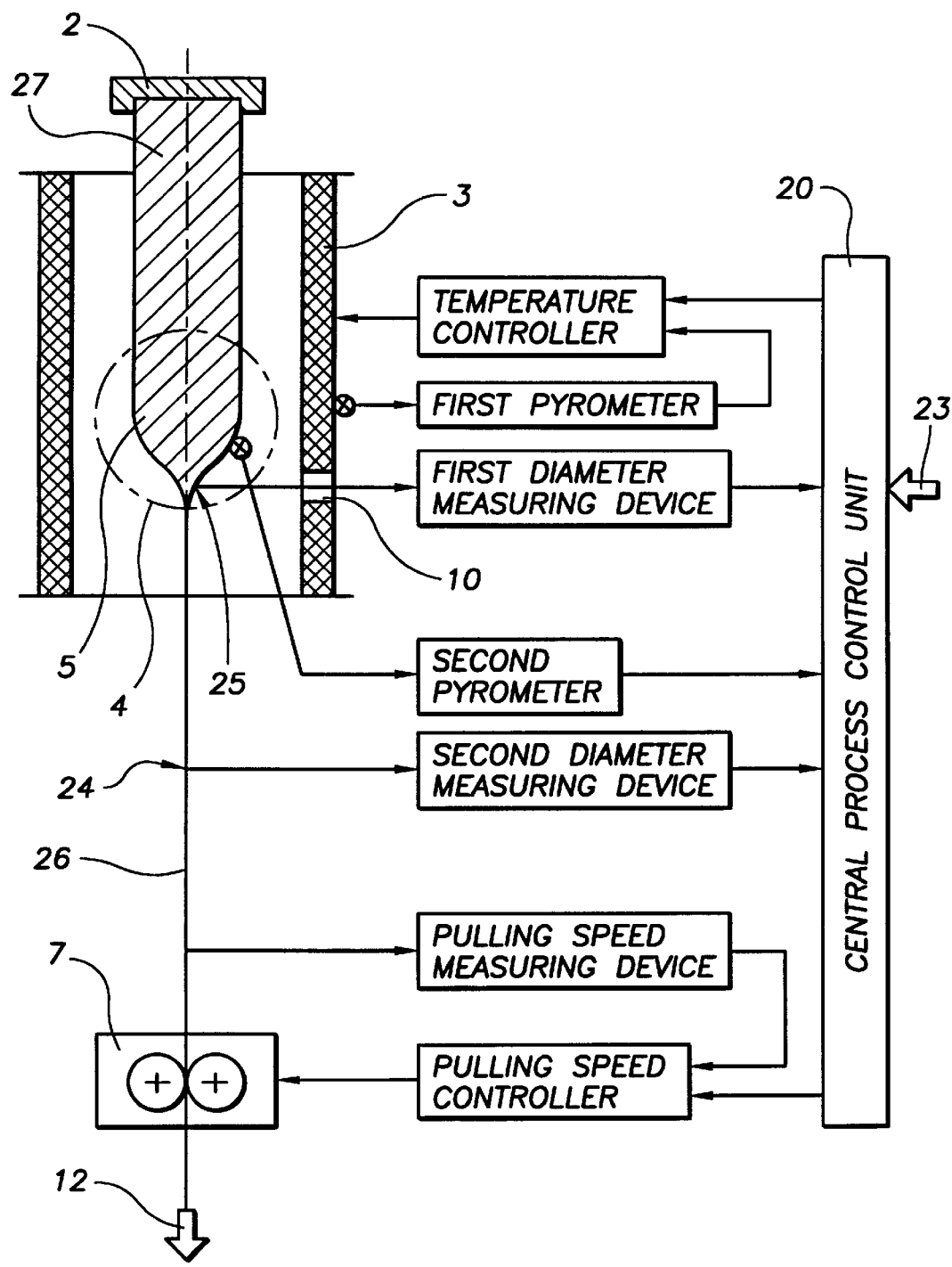
FIG. 2 shows a longitudinal section of an apparatus for drawing a fiber.

The embodiment of the apparatus according to the invention illustrated in FIG. 2 is used to draw an optical fiber 26 from a solid, cylindrical preform 27. The reference numbers here which are the same as those used in FIG. 1 pertain to the same or equivalent parts as those explained in connection with FIG. 1.

To determine the diameter of fiber 26, a video camera 8 is provided in the area outside deformation zone 4. To determine the fiber diameter within deformation zone 4, a diameter measuring device 9 is set up in the immediate vicinity of furnace 3. Diameter measuring device 9 detects the fiber diameter in the area of deformation zone 4 in a contactless manner through an opening 10 in furnace 3.

To measure the temperature of furnace 3, a first pyrometer 13 is used. The temperature of drawing bulb 5 is measured by means of a second pyrometer 14. The temperature of furnace 3 is controlled by means of a temperature controller 15, which, in a cascaded control system, takes into account the temperature of drawing bulb 5 as the main controlled variable and the temperature of furnace 3 as an auxiliary controlled variable.

The fiber take-off rate is detected by means of a speed measuring device 22 and adjusted by way of a speed controller 21.

The measurement sites associated with the various schematically illustrated measuring devices 8; 9, 13; 14; 15–19; 22 in the area of fiber 26 and furnace 3 are characterized by the points where the connecting lines proceeding from the devices contact the surface of objects 3; 26, 27 to be measured.

The following parameters are fed to central process control unit 20: the fiber drawing rate, detected by speed measuring device 22; the fiber diameter, measured by video camera 8; the fiber diameter, measured by second diameter measuring device 9; the temperature of furnace 3, measured by first pyrometer 13; and the temperature of drawing bulb 5, measured by second pyrometer 14. Process control unit 20 drives temperature controller 15 of furnace 3 and controller 21 of take-off unit 7.

The apparatus according to the invention makes it possible to predict the actual diameter of the fiber without any dead time, as a result of which the dimensional accuracy of the fiber diameter is significantly improved. The method according to the invention for drawing fiber 26 is explained in the following on the basis of an exemplary embodiment.

The diameter of fiber 26 is used as the controlled variable for the control of the process. The nominal value of the fiber diameter is 127 μm. The fiber drawing rate serves as the controlling variable. The process of controlling the fiber diameter in such a way that it conforms to the control input is explained in greater detail below.

At measurement site 25, a first value of the fiber diameter is measured by first diameter measuring device 9. This measurement value is used to predict the fiber diameter to be expected. For this prediction, the measurement value—after a delay in a shift register by a period of time equal to the measurement dead time between upper measurement point 25 and lower measurement point 24—is compared with the fiber diameter measured by diameter measuring device 8 at lower measuring point 24. The correlation value between the fiber diameter measured at upper measurement point 25 and the fiber diameter measured at lower measurement point 24 is determined as the difference or as the quotient of the measurement values, which can then be used to predict the final fiber diameter for every other fiber diameter measured by first diameter measuring device 9. The estimate of the fiber diameter is again estimated on the basis of a linear model, which corresponds to the one explained on the basis of FIG. 1 for the outside diameter of the tube.

For the determination of the correlation value, which is updated at regular intervals of 0.01 second, the current values of the fiber drawing rate are also taken into account.

The method according to the invention makes it possible to predict the expected fiber diameter without any dead time. The advantageous effect of the invention consists in a significant improvement in the dimensional accuracy of fiber 26 insofar as, for control, the value of the fiber diameter estimated without dead time is used instead of the actual fiber diameter measured by diameter measuring device 8.

A further improvement in the dimensional accuracy of the fiber diameter is achieved by the drawing bulb temperature supplied by pyrometer 14. The effect of this temperature measurement consists in that nonsteady-state changes in the deformation temperature, such as those which occur during the startup and final phases of the process, are recognized by changes in the temperature of deformation zone 4 and can be compensated by a correction of the furnace temperature. This leads to greater uniformity in the course of the deformation temperature and thus to greater uniformity in the dynamic deformation behavior and a significant improvement in the dimensional accuracy.

All controllers of control unit 20 are designed as fuzzy logic controllers.

Another exemplary embodiment of the method according to the invention which pertains to the temperature control is explained in greater detail below on the basis of FIG. 1.

The method is used for the production of a tube 6. The process parameters set for the drawing of the tube are the same as those cited above for the explanation of the first variant of the method in FIG. 1. To improve the temperature control and the dynamic deformation behavior and thus the dimensional accuracy of the tube, the temperature of drawing bulb 5 is used in a cascaded control system as the main controlled variable, whereas the temperature of furnace 3 serves as an auxiliary controlled variable for the control.

For this purpose, a nominal temperature for drawing bulb 5 of approximately 1,850° C. is entered in control unit 20. The temperature of drawing bulb 5 is measured by a pyrometer 14; the nominal-actual deviation is determined; and temperature controller 15 for furnace 3 is driven in such a way that the drawing bulb temperature is kept constant.

Changes in the temperature of the drawing bulb, such as those which occur during the startup and final phases of the drawing process, are recognized by the method according to the invention and can then be compensated by a correction of the temperature of the heating device.

In the exemplary embodiments cited above, fuzzy logic controllers are used as controllers, except for the temperature. In this way, heuristic expert knowledge can be incorporated into the control process.

We claim:

1. Method of producing an elongated component of glass, said method comprising
heating a glass blank to form a softened region,
drawing said component continuously from the softened region in a drawing direction at a drawing rate to form a drawing bulb,
continually measuring a geometric variable at a first measurement site adjacent the drawing bulb and at a second measurement site displaced therefrom by an intersite distance in said drawing direction to obtain measurements as said component is drawn,
determining values for a controlled variable, each of said values being based on a respective one of the measurements taken at said first measurement site,
adjusting each of the values for the controlled variable based on a respective one of the measurements of the geometric variable measured at said second measurement site and a respective earlier value of the controlled variable determined based on one of the measurements at the first measurement site that precedes said measurement at said second measurement site by a period of dead time related to the drawing rate and the intersite distance,
determining deviations between at least one desired value and the adjusted values of the controlled variable, and
controlling the drawing of said component based on values of a controlling variable determined based on the deviations.

2. Method according to claim 1, said determining step including
determining a correlation value from one of the measurements at the second measurement site and one of the measurements at the first measurement site which precedes said measurement at the second site by the dead time; and
the determining of one of the values of the controlled variable being based on another measurement of the geometric variable at the first measurement site and the correlation value.

3. Method according to claim 2, wherein the correlation value is determined additionally based on the value of the controlling variable.

4. Method according to claim 2 wherein the correlation value is updated at regular intervals.

5. Method according to claim 4, wherein the intervals are in the range of 0.5 to 5 seconds.

6. Method according to claim 1 wherein the component has an outside diameter and the controlled variable and the geometric variable or variables are the outside diameter of the component.

7. Method according to claim 1 wherein fuzzy logic controllers are used for determining the value of the controlling variable.

8. Method according to claim 1, wherein the component is tubular with an outer diameter, an inner diameter, and a wall thickness therebetween, and the geometric variables include the outer diameter of the component and at least one of the inner diameter of the component and the wall thickness of the component.

9. A method of producing an elongated component of glass, said method comprising:
heating a glass blank to form a softened region;
drawing the component from the softened region in a drawing direction at a drawing rate to form a drawing bulb;
continually taking measurements of a first geometric variable at a first measurement site adjacent the drawing bulb;
continually taking measurements of a second geometric variable at a second measurement site displaced from the first site in said drawing direction by an intersite distance;

determining for each measurement at the first site a respective value for a controlled variable, each value representing a first estimate of a value of an actual process parameter for a point in time that follows said respective first site measurement by a period of dead time, the actual process parameter being equal or related to the second geometric variable measured at the second site;

each value for the controlled variable being determined from the respective first site measurement and on a comparison of a value of the actual process parameter determined from the most recent measurement at the second site with an earlier one of the values of the controlled variable, which value was determined based on the measurement at the first measurement site preceding said most recent second-site measurement by the respective period of dead time;

comparing each of the values of the controlled variable with a desired controlled variable to obtain a respective value of a controlling variable; and controlling the drawing of the component responsive to the values of the controlling variable.

10. The method of claim 9, wherein the values of the controlled variable are determined based on a difference calculated between the value of the actual process parameter and said earlier one of the values of the controlled variable.

11. The method of claim 9 wherein the values of the controlled variable are determined using a correlation derived from one of the first site measurements and one of the second site measurements taken after said first site measurement by said period of dead time.

12. The method of claim 9, wherein the component has an outer surface with an outer diameter, and the first and second geometric variables, and the actual parameter all represent the outer diameter of the component.

13. The method of claim 9 wherein the component produced is tubular and has an inside diameter, an outside diameter and a wall thickness therebetween, the method further comprising continually taking measurements of a third geometric variable of the component at a third measurement site spaced from said first measurement site.

14. The method of claim 13, and further comprising determining values of a second controlled variable each based on a respective one of the measurements taken at the first site and one of the measurements taken at the third site at the same time, said values of the second controlled variable each representing a respective estimated value for a second process parameter at a point in time which follows the first-site measurement by a respective period of dead time;

comparing each of said values of the second controlled variable with a respective desired value to determine a respective deviation value; and determining from said deviation a second controlling variable for controlling the drawing of the component.

15. The method of claim 14 wherein the determining of the second controlled variable includes determining a first value of the second controlled variable for the first-site measurement, determining a change value for the second controlled variable from said first value and the desired value for said second controlled variable, and determining a second value for the second controlled variable based on a current value of the second controlling variable, the determined change value, the measurement at the first measurement site, and the current value of the second controlled variable.

16. The method of claim 15 wherein the first and second measured geometric variable, the first process parameter, and the first controlled variable all represent the outer diameter of the component;

the first controlling variable represents a varying blowing pressure applied to the component;

the third geometric variable represents the wall thickness of the component;

the second controlled variable represents the wall thickness or a cross-sectional area of the tubular component taken perpendicularly to the drawing direction; and the second controlling variable represents the drawing rate of the component.

* * * * *